United States Patent
Tanaka et al.

(10) Patent No.: US 10,562,015 B2
(45) Date of Patent: Feb. 18, 2020

(54) HONEYCOMB STRUCTURE

(71) Applicant: NGK INSULATORS, LTD., Nagoya (JP)

(72) Inventors: Hajime Tanaka, Nagoya (JP); Tomokatsu Aoyama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 259 days.

(21) Appl. No.: 15/464,693

(22) Filed: Mar. 21, 2017

(65) Prior Publication Data
US 2017/0282164 A1    Oct. 5, 2017

(30) Foreign Application Priority Data

Mar. 30, 2016   (JP) .................................. 2016-067009

(51) Int. Cl.
| | |
|---|---|
| *B32B 3/12* | (2006.01) |
| *B01J 27/224* | (2006.01) |
| *B01D 46/24* | (2006.01) |
| *B01D 53/94* | (2006.01) |
| *B01J 35/04* | (2006.01) |

(Continued)

(52) U.S. Cl.
CPC ........ *B01J 27/224* (2013.01); *B01D 46/2451* (2013.01); *B01D 53/94* (2013.01); *B01J 35/04* (2013.01); *B01J 37/0018* (2013.01); *B01J 37/04* (2013.01); *B01J 37/082* (2013.01); *B01D 2046/2481* (2013.01); *B01D 2255/915* (2013.01); *B01D 2279/30* (2013.01)

(58) Field of Classification Search
None
See application file for complete search history.

(56) References Cited

U.S. PATENT DOCUMENTS

| | | | | |
|---|---|---|---|---|
| 5,080,953 A | * | 1/1992 | Horikawa ................ | B01J 35/04 428/116 |
| 2002/0068025 A1 | | 6/2002 | Foster et al. | |

(Continued)

FOREIGN PATENT DOCUMENTS

| | | |
|---|---|---|
| DE | 68911086 T2 | 5/1994 |
| DE | 10 2013 015 626 A1 | 3/2014 |

(Continued)

OTHER PUBLICATIONS

German Office Action, German Application No. 10 2017 002 850.8, dated Jun. 4, 2019 (6 pages).

*Primary Examiner* — David Sample
*Assistant Examiner* — Mary I Omori
(74) *Attorney, Agent, or Firm* — Burr & Brown, PLLC

(57) ABSTRACT

A honeycomb structure includes: a honeycomb structure body; and a convex part that protrudes outward from a part of circumference of the honeycomb structure body. The convex part surrounds the circumference of the honeycomb structure body like a ring. The convex part is of a tapered shape at least at one end having a tapered face. The convex part has a circumference coating layer making up the tapered face. The convex part has a maximum thickness of 1 to 20 mm, and a rough-face region on the tapered face, the rough-face region having surface roughness of 5 to 70 μm. The rough-face region has a total of a rough-face region angle of 108° or more. An inclination angle formed between the tapered face and the extending direction of the cells is 10 to 80 degrees.

5 Claims, 4 Drawing Sheets

(51) Int. Cl.
*B01J 37/00* (2006.01)
*B01J 37/04* (2006.01)
*B01J 37/08* (2006.01)

(56) References Cited

U.S. PATENT DOCUMENTS

| | | | | |
|---|---|---|---|---|
| 2005/0025933 | A1* | 2/2005 | Masukawa | B01J 35/04 |
| | | | | 428/116 |
| 2006/0292339 | A1* | 12/2006 | Ohno | B01D 39/2086 |
| | | | | 428/116 |
| 2014/0087128 | A1* | 3/2014 | Yanase | B01D 46/2462 |
| | | | | 428/116 |
| 2014/0087636 | A1* | 3/2014 | Fujioka | B24B 1/00 |
| | | | | 451/41 |
| 2014/0123612 | A1* | 5/2014 | Yamada | B01D 46/2459 |
| | | | | 55/523 |
| 2014/0363616 | A1* | 12/2014 | Aoyama | B01D 53/74 |
| | | | | 428/116 |

FOREIGN PATENT DOCUMENTS

| | | |
|---|---|---|
| DE | 10 2014 008 271 A1 | 12/2014 |
| EP | 0 360 591 A2 | 3/1990 |
| JP | 2001-329836 A | 11/2001 |
| JP | 2002-070545 A | 3/2002 |
| JP | 2010-184218 A1 | 8/2010 |

* cited by examiner

HONEYCOMB STRUCTURE

"The present application is an application based on JP-2016-067009 filed on Mar. 30, 2016 with Japan Patent Office, the entire contents of which are incorporated herein by reference."

BACKGROUND OF THE INVENTION

Field of the Invention

The present invention relates to honeycomb structures. More specifically the present invention relates to a honeycomb structure configured to suppress the displacement in the circumferential direction when the honeycomb structure is stored in a casing, and to suppress a breakage of a mat wrapped around the circumference of the honeycomb structure when the honeycomb structure is stored in a casing.

Description of the Related Art

Conventionally, honeycomb structures have been known, which include a honeycomb-shaped inner pillar part (honeycomb structure body) and a convex part formed at the circumference of the inner pillar part. These honeycomb structures are used as a catalyst carrier loaded with catalyst to purify exhaust gas from an internal combustion engine of a vehicle and a ship and as a filter element of a dust collector. One example of such a honeycomb structure is disclosed, which includes a convex part having at least one end face of a tapered shape (see Patent Document 1).

[Patent Document 1] JP-A-2010-184218

SUMMARY OF THE INVENTION

A honeycomb structure described in Patent Document 1, however, has problems occurring in some usage conditions, such as the displacement in the circumferential direction when it is stored in a casing and abnormal noise due to vibrations of a vehicle or the like.

In view of the problems as stated above, the present invention provides a honeycomb structure configured to suppress the displacement in the circumferential direction when the honeycomb structure is stored in a casing, and to suppress a breakage of a mat wrapped around the circumference of the honeycomb structure when the honeycomb structure is stored in a casing.

According to a first aspect of the present invention, a honeycomb structure is provided, including: a honeycomb structure body having an inflow end face as one end face and an outflow end face as the other end face and having a porous partition wall that defines a plurality of cells, the plurality of cells extending from the inflow end face to the outflow end face and serving as a through channel of fluid; and a convex part that protrudes outward from a part of circumference of the honeycomb structure body, wherein the convex part is disposed to surround the circumference of the honeycomb structure body like a ring continuously or intermittently, the convex part is of a tapered shape at least at one end having a tapered face, the convex part has a circumference coating layer at least making up the tapered face, the convex part has a maximum thickness of 1 to 20 mm in a cross section orthogonal to the extending direction of the cells, the convex part has a rough-face region on the tapered face including the circumference coating layer, the rough-face region having surface roughness of 5 to 70 µm, the honeycomb structure has a total of a rough-face region angle $\theta$ of 108° or more, the rough-face region angle $\theta$ being a largest angle formed between two straight lines drawn from a center axis of the honeycomb structure toward an outer periphery so as to pass through the rough-face region, when the honeycomb structure is viewed parallel to the center axis of the honeycomb structure, and an inclination angle formed between the tapered face and the extending direction of the cells in a cross section parallel to the extending direction of the cells is 10 to 80 degrees.

According to a second aspect of the present invention, the honeycomb structure according to the first aspect is provided, wherein the convex part has width in a cross section parallel to the extending direction of the cells, the width being 1 to 80% of an overall length of the honeycomb structure body.

According to a third aspect of the present invention, the honeycomb structure according to the first or second aspects is provided, wherein a part of the surface of the convex part defines a flat part that is a flat face parallel to the extending direction of the cells.

According to a fourth aspect of the present invention, the honeycomb structure according to any one of the first to thud aspects is provided, wherein the honeycomb structure body includes at least one type selected from the group consisting of cordierite, silicon carbide, mullite, aluminum titanate, and alumina.

According to a fifth aspect of the present invention, the honeycomb structure according to any one of the first to fourth aspects is provided, wherein the honeycomb structure body has a plugging portion configured to plug open ends of inflow cells as predetermined cells of the plurality of cells at the inflow end face and open ends of outflow cells as residual cells of the plurality of cells at the outflow end face.

The honeycomb structure of the present invention includes a predetermined convex part having a tapered face and a circumference coating layer covering the tapered face of the convex part and having a rough-face region on the surface. This rough-face region is a region having the total of the rough-face region angles 0 of 108° or more. With this configuration, the honeycomb structure of the present invention can suppress the displacement in the circumferential direction when the honeycomb structure is stored in a casing. As a result, the honeycomb structure of the present invention hardly breaks a mat that is wrapped around the circumference of the honeycomb structure when the honeycomb structure is stored in the casing.

DESCRIPTION OF THE PREFERRED EMBODIMENTS

The following specifically describes embodiments of the present invention, with reference to the drawings. The present invention is not limited to the following embodiments. The present invention is to be understood to include the following embodiments, to which modifications and improvements are added as needed based on the ordinary knowledge of a person skilled in the art without departing from the scope of the present invention.

Figure 1:
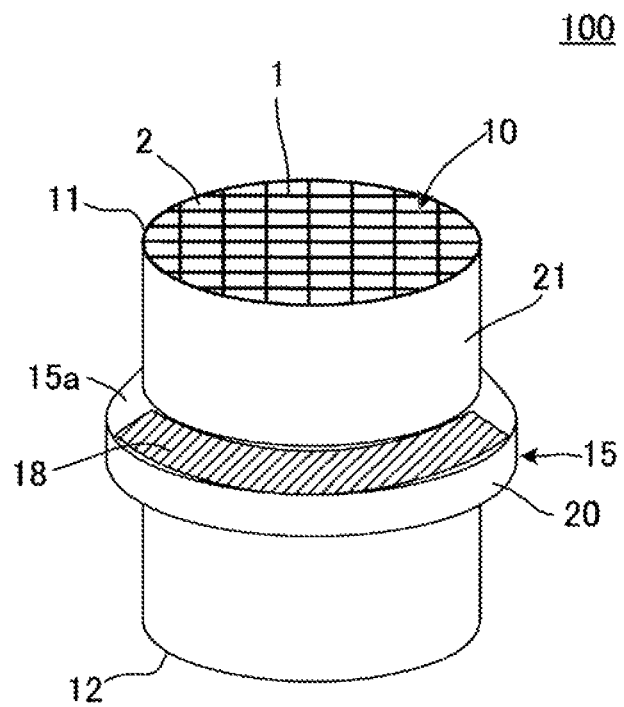
FIG. 1 is a perspective view schematically showing one embodiment of the honeycomb structure of the present invention.
Figure 2:
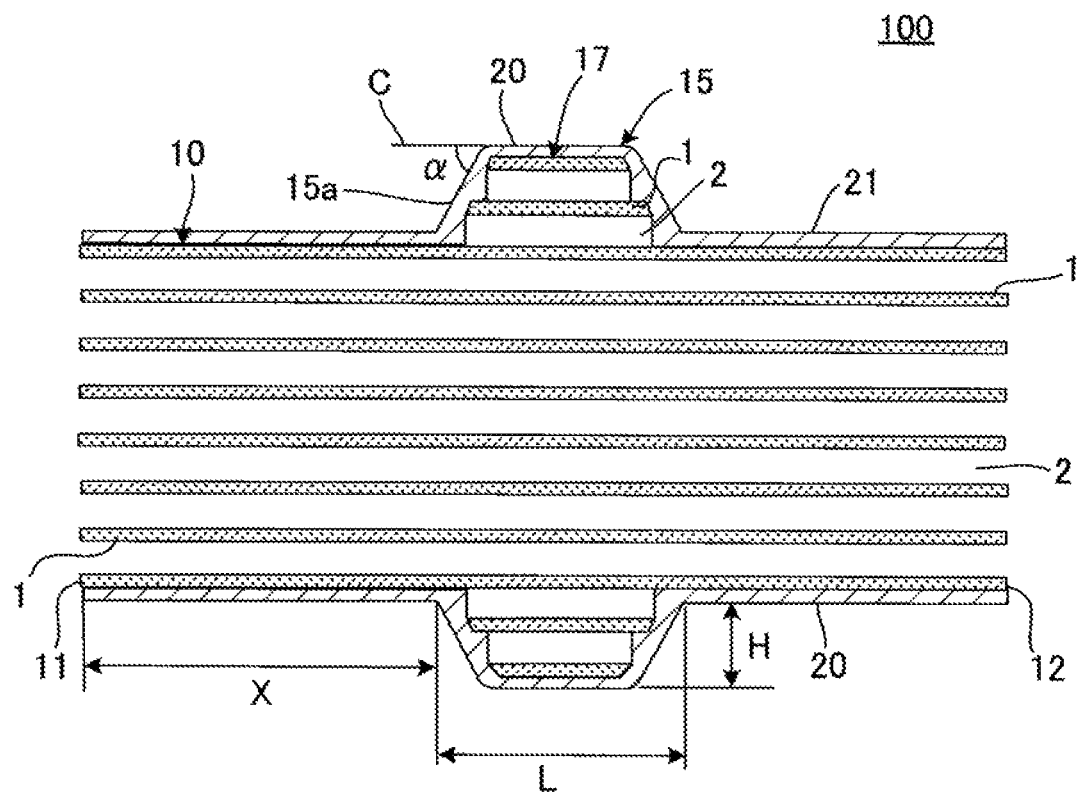
FIG. 2 is a schematic view of a cross section that is parallel to the extending direction of cells in one embodiment of the honeycomb structure of the present invention.
Figure 6:
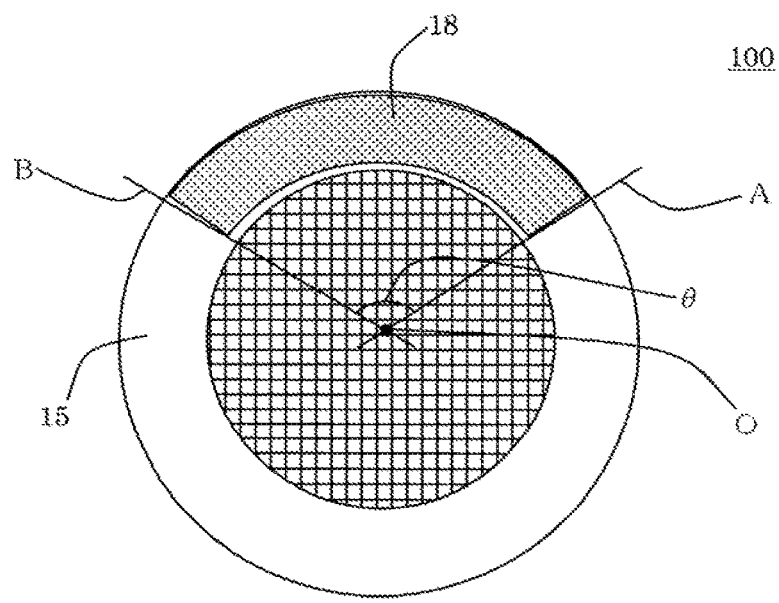
FIG. 6 is a plan view schematically showing one embodiment of the honeycomb structure of the present invention viewed from the direction parallel to the central axis.

(1) Honeycomb Structure:

One embodiment of the honeycomb structure of the present invention is a honeycomb structure 100 shown in FIGS. 1 and 2. The honeycomb structure 100 includes a honeycomb structure body 10 having a porous partition wall 1 and a convex part 15 that protrudes outward from a part of the circumference of this honeycomb structure body 10. The partition wall 1 defines a plurality of cells 2, and the plurality of cells extends from an inflow end face 11 as one end face to the outflow end face 12 as the other end face and serves as a through channel of fluid. The convex part 15 of the honeycomb structure 100 is disposed to surround the circumference of the honeycomb structure body 10 like a ring continuously or intermittently. The convex part 15 is of a tapered shape and has at least one end that has a tapered face 15a. The convex part 15 has a circumference coating layer 20 at least making up the tapered face 15a. The convex part 15 has a maximum thickness of 1 to 20 min in a cross section orthogonal to the extending direction of the cells 2. The convex part 15 has a rough-face region 18 on the tapered face 15a including the circumference coating layer 20, and the rough-face region has surface roughness of 5 to 70 μm. The honeycomb structure 100 is viewed in parallel with the center axis O of the honeycomb structure 100. That is, the honeycomb structure 100 is viewed while bringing the line of vision in line with the center axis O. In this case (see FIG. 6), two straight lines A and B are drawn from the center axis O of the honeycomb structure 100 toward the outer periphery so as to pass through the rough-face region 18. When these straight lines A and B form the maximum angle therebetween, such an angle is called a rough-face region angle θ. At this time, the rough-face region 18 of the convex part 15 has the total rough-face region angle θ of 108° or more. In the honeycomb structure 100, the tapered face 15a and the extending direction of the cells 2 form an angle in a cross section parallel to the extending direction of the cells 2, and this angle is called an inclination angle α. The inclination angle α is 10 to 80 degrees. The rough-face region angle θ is the angle on the side of the rough-face region between the angles formed with straight lines A and B.

Such a honeycomb structure 100 includes the convex part 15 having the tapered face 15a, on which the rough-face region 18 is disposed. The total rough-face region angle θ of the rough-face region 18 of this convex part 15 is 108° or more. With this configuration, the honeycomb structure 100 can suppress the displacement in the circumferential direction when the honeycomb structure is stored in a casing. The honeycomb structure 100 can suppress a breakage of a mat wrapped around the circumference of the honeycomb structure 100 when the honeycomb structure 100 is stored in a casing.

FIG. 1 is a perspective view schematically showing one embodiment of the honeycomb structure of the present invention. FIG. 2 is a schematic view of a cross section that is parallel to the extending direction of cells in one embodiment of the honeycomb structure of the present invention.

(1-1) Convex Part:

The convex part is disposed to surround the circumference of the honeycomb structure body like a ring continuously or intermittently. Such a convex part can control the movement of the honeycomb structure in the direction of the center axis when the honeycomb structure is stored in a casing and vibrations are given to the honeycomb structure, for example. That is, this convex part can prevent the displacement of the honeycomb structure in the direction of the center axis.

"To surround the circumference of the honeycomb structure body like a ring continuously" refers to the annular convex part surrounding the honeycomb structure body so that the convex part does not have a missing part along the circumference of the honeycomb structure body. "To surround like a ring intermittently" refers to the convex part surrounding the honeycomb structure body so that the convex part has a missing part along the circumference of the honeycomb structure body. In other words, "to surround like a ring intermittently" means that the outer edge of the honeycomb structure includes the surface of the convex part and the lateral face (circumference) of the honeycomb structure body when the honeycomb structure is viewed in the direction of the center axis of the honeycomb structure. "When the honeycomb structure is viewed in the direction of the center axis of the honeycomb structure" means that the honeycomb structure is viewed while bringing the line of vision in line with the center axis of the honeycomb structure.

The convex part is of a tapered shape at least at one end having a tapered face. The convex part has a circumference coating layer at least making up the tapered face. That is, as shown in FIGS. 1 and 2, the convex part 15 is provided with the circumference coating layer 20 at least at a part of the surface thereof. This circumference coating layer 20 is disposed so as to at least make up the tapered face 15a of the convex part 15. Such a circumference coating layer 20 disposed can suppress a defect such as chipping of the convex part 15 even when external force is applied to the convex part 15 during conveyance of the honeycomb structure 100. As shown in FIG. 2, a part (convex body 17) of the convex part 15 that is covered with the circumference coating layer 20 preferably is of a tapered shape and has at least one end that has a tapered face. This facilitates the formation of the tapered face 15a including the circumference coating layer 20.

In the honeycomb structure of the present invention, the tapered face of the convex part and the extending direction of the cells form an inclination angle α in a cross section parallel to the extending direction of the cells, and the inclination angle α is 10 to 80 degrees. This inclination angle α is preferably 10 to 80 degrees, and 20 to 60 degrees more preferably. If the inclination angle α is less than the lower limit, such a honeycomb structure may not be mounted in a limited mounting space of a vehicle or the like. If the angle exceeds the upper limit, chipping may occur at the end of the ring-shaped convex part (outermost circumference). Note here that the inclination angle α can be an angle formed between the tapered face 15*a* and straight line C parallel to the extending direction of the cells 2 in a cross section parallel to the extending direction of the cells 2 as shown in FIG. 2.

In the honeycomb structure 100, the tapered face of the convex body 17 and the extending direction of the cells 2 form an inclination angle therebetween in a cross section parallel to the extending direction of the cells, and this inclination angle also is preferably 10 to 80 degrees. With this configuration, the inclination angle α as the angle formed between the tapered face of the convex part and the extending direction of the cells can be easily within the above range when the honeycomb structure 100 is manufactured.

In a cross section orthogonal to the extending direction of the cells, the convex part has a maximum thickness of 1 to 20 mm, preferably 3 to 15 mm, and more preferably 5 to 10 mm. If this maximum thickness is less than the lower limit, the convex part cannot hold the honeycomb structure. That is, when the honeycomb structure is stored in a casing, the honeycomb structure will be displaced in the direction of the center axis and in the circumferential direction. If the maximum thickness exceeds the upper limit, it is difficult to mount the honeycomb structure in a limited mounting space of a vehicle or the like. The "thickness of the convex part" can be a height in the direction protruding from the honeycomb structure body (see "H" in FIG. 4). The thickness of the convex part is a value including the circumference coating layer.

The convex part has a width in a cross section parallel to the extending direction of the cells, and the width is preferably 1 to 80% of the overall length of the honeycomb structure body, and 5 to 20% particularly preferably. If the width of the convex part is less than the lower limit, the convex part may not hold the honeycomb structure. If the width exceeds the upper limit, such a honeycomb structure cannot be mounted in a limited mounting space of a vehicle or the like. The "width of the convex part" is a length of the convex part in the extending direction of the cells of the honeycomb structure (see "L" in FIG. 2). The width of the convex part is a value including the circumference coating layer.

The convex part 15 may be disposed at any position of the honeycomb structure body 10 in the extending direction of the cells 2. For instance, the convex part 15 may be disposed at a center of the honeycomb structure body 10 or may be disposed at an end. The convex part 15 preferably is disposed at a center of the honeycomb structure body 10. The center of the honeycomb structure body is a center of the honeycomb structure body in the extending direction of the cells. Specifically a preferable position of the convex part is such that distance X from the inflow end face of the honeycomb structure body to the end of the convex part close to the inflow end face (see FIG. 2) is 1% or more of the length of the honeycomb structure in the extending direction of the cells. If the distance X is less than lower limit, it is difficult to place a mat so as to surround the circumference of the honeycomb structure when the honeycomb structure is stored in a casing. Therefore such a honeycomb structure may not be stored in the casing.

The number of the convex part is not limited to 1. That is, a plurality of convex parts may be disposed. When a plurality of convex parts is disposed, these convex parts preferably are disposed at least at an end of the honeycomb structure close to the outflow end face and at a center of the honeycomb structure.

This circumference coating layer is disposed to at least make up the tapered face of the convex part. Such a circumference coating layer can suppress a defect such as chipping of the convex part even when external force is applied to the convex part during conveyance of the honeycomb structure. When the convex part has a honeycomb structure, the circumference coating layer can prevent exhaust gas from leaking from the convex part. "The convex part having a honeycomb structure" means that the convex part has a partition wall that defines a plurality of cells parallel to the extending direction of the cells of the honeycomb structure body. The honeycomb structure 100 of FIG. 2 is an example where the convex part 15 has a partition wall 1 that defines a plurality of cells 2 parallel to the extending direction of the cells 2 of the honeycomb structure body 10. In this example, the cells 2 of the convex part 15 have open ends that are filled with the circumference coating layer 20. This configuration can prevent exhaust gas from leaking from the convex part as described above.

The convex part has a rough-face region on the tapered face including the circumference coating layer, and the rough-face region has surface roughness of 5 to 70 μm. In the honeycomb structure of the present invention, a region (smooth-face region) other than the rough-face region has a value of surface roughness that is smaller than the value of surface roughness of the rough-face region. That is, a region of the convex part other than the rough-face region is smooth on the circumferential face of the honeycomb structure body and on the surface of the convex part. Whereas, the rough-face region has a rough surface (its surface roughness is 5 to 70 μm). In this way, the surface at a predetermined part is intentionally roughened, whereby the displacement of the honeycomb structure in the circumferential direction when being stored in a casing can be prevented favorably.

The rough-face region has surface roughness of 5 to 70 μm, and preferably 15 to 60 μm. If the surface roughness of the rough-face region is less than the lower limit, the displacement of the honeycomb structure in the circumferential direction when being stored in a casing increases. The convex part of the honeycomb structure may come in partial contact with the inner wall of the casing via the mat, and the honeycomb structure may break. If the surface roughness exceeds the upper limit, frictional resistance between the rough-face region and the mat wrapped around the circumference of the honeycomb structure when the honeycomb structure is stored in a casing increases. This may lead to a breakage of the mat. The surface roughness (Ra) is a value measured in accordance with arithmetic average roughness JIS B 0601:2001.

The value of surface roughness of the smooth-face region is not limited especially as long as it is smaller than the value of surface roughness of the rough-face region. For instance, this may be 0 μm or more and less than 5 μm.

Figure 7:
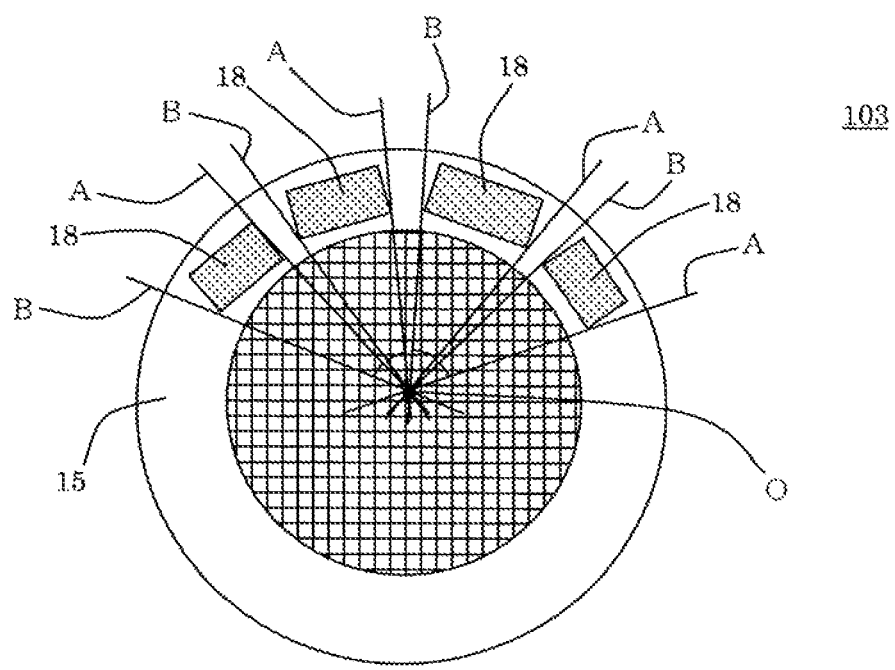
FIG. 7 is a plan view schematically showing another embodiment of the honeycomb structure of the present invention viewed from the direction parallel to the central axis.

The rough-face region in the tapered face of the circumference coating layer is such that the total rough-face region angle θ is 108° or more. This total rough-face region angle θ is preferably 108 to 360°, and 144 to 360° more preferably. If the total rough-face region angle θ is less than the lower limit, the displacement of the honeycomb structure in the circumferential direction when being stored in a casing is large. Due to such displacement of the honeycomb structure, the mat may break. When the honeycomb structure includes one rough-face region, the one rough-face region has a rough-face region angle θ of 108° or more. When the honeycomb structure includes a plurality of rough-face regions, the total rough-face region angle θ of these rough-face regions is 108° or more. The honeycomb structure 103 shown in FIG. 7 includes four rough-face regions 18, and these rough-face regions 18 have intervals in the circumferential direction. In this case, as shown in FIG. 7, two straight lines A and B are drawn for each rough-face region 18, and the angle formed between the straight lines A and B is found. Then, the total of these angles is the rough-face region angle θ.

The circumference coating layer has a thickness of 1 to 5000 μm preferably, and 10 to 3000 μm more preferably. If the thickness of the circumference coating layer is less than the lower limit, slurry for catalyst, which is used for loading of the catalyst, may leak from the honeycomb structure. If the thickness exceeds the upper limit, the ratio of a part that does not have a function to purify exhaust gas in cross section increases. As a result, the purification performance may deteriorate.

The honeycomb structure of the present invention preferably has a flat part at a part of the surface of the convex part, and the flat part is a flat face parallel to the extending direction of the cells. Such a flat part allows the thickness of the convex part to be thin at the flat part (see "h" of FIG. 4). This allows the honeycomb structure to be stored in an existing packaging that is used to convey the honeycomb structure. Since the honeycomb structure of the present invention includes the convex part, it is wider than a conventional honeycomb structure having similar performance by the thickness of the convex part. This may lead to the necessity of changing the size of a packaging that is used to store a plurality of these honeycomb structures for conveyance. On the contrary, a honeycomb structure having such a flat part can be stored in an existing packaging as stated above. Such a honeycomb structure can be mounted in a small mounting space as in a vehicle. A honeycomb structure with such a flat part can suppress its displacement in the circumferential direction as well.

A honeycomb structure including a flat part has these advantages. Meanwhile, such a flat part of the honeycomb structure may come in contact with a flat part of the casing, depending on the size of the flat part. In this case, a partial contact may occur between the honeycomb structure and the mat wrapped around the circumference of the honeycomb structure when the honeycomb structure moves slightly. The "flat part of the casing" refers to a flat part of the casing that is fitted into the flat part of the honeycomb structure. "Partial contact" refers to the following state. This refers to the state where the mat and the honeycomb structure come in contact locally, and a large load is applied to a part of the mat sandwiched between the honeycomb structure and the casing. As a result of the partial contact, a breakage may occur at the convex part of the honeycomb structure.

Figure 3:
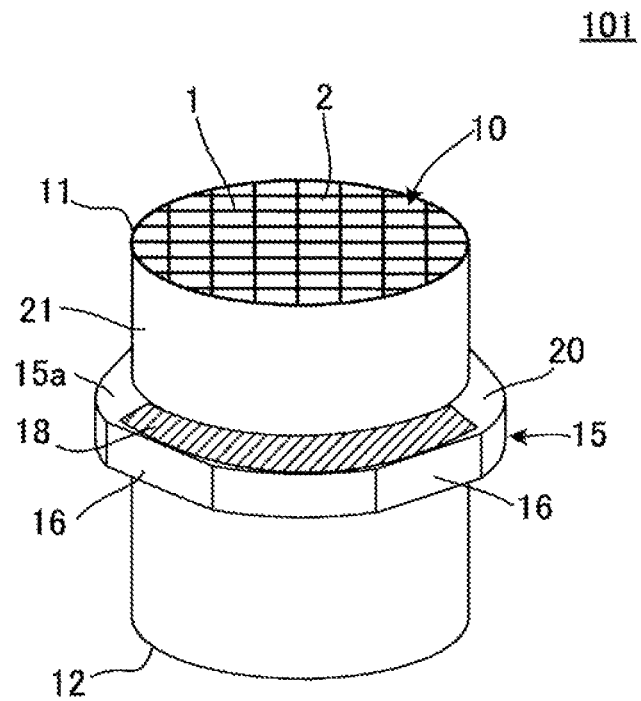
FIG. 3 is a perspective view schematically showing another embodiment of the honeycomb structure of the present invention.
Figure 4:
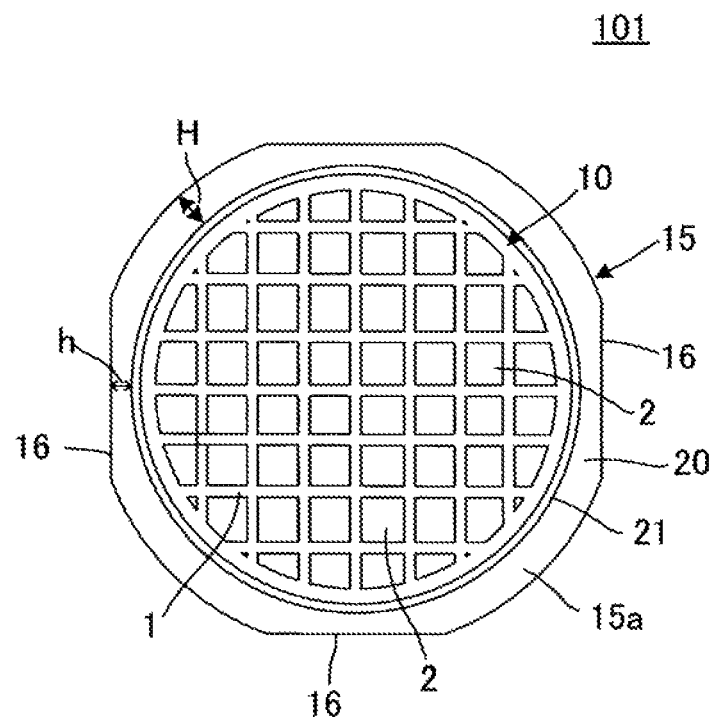
FIG. 4 is a schematic view of a cross section that is orthogonal to the extending direction of cells in another embodiment of the honeycomb structure of the present invention.

FIGS. 3 and 4 show a honeycomb structure 101 including a flat part 16 at a part of the surface of the convex part 15, and the flat part is a flat face orthogonal to the extending direction of the cells 2. FIG. 3 is a perspective view schematically showing another embodiment of the honeycomb structure of the present invention. FIG. 4 is a schematic view of a cross section that is orthogonal to the extending direction of cells in another embodiment of the honeycomb structure of the present invention.

The convex part preferably includes a pair of flat parts that are mutually parallel. Preferably the convex part includes two pairs of the mutually parallel flat parts. In this case, one of the pairs of flat parts is preferably orthogonal to the other pair of flat parts. Since the thickness of the convex part can be left aside with a honeycomb structure having such flat parts, the honeycomb structure can be stored in an existing packaging as stated above. As compared with the honeycomb structure without a flat part, its storing space can be small. Therefore the honeycomb structure of the present invention can be mounted favorably in a small mounting space as in a vehicle.

The honeycomb structure 101 of FIG. 4 includes two pairs of flat parts 16 that are mutually parallel, and one of the pairs of the flat parts 16 is orthogonal to the other pair of flat parts 16.

(1-2) Honeycomb Structure Body:

The honeycomb structure body 10 may include, as major components, at least one type selected from the group consisting of cordierite, silicon carbide, mullite, aluminum titanate, and alumina. The honeycomb structure body 10 preferably includes at least one type selected from the group consisting of cordierite, silicon carbide, mullite, aluminum titanate, and alumina. In the description, the "major component" refers to the component exceeding 50 mass % or more of all of the components.

The partition wall 1 has an average pore diameter of 5 to 100 μm preferably, and 8 to 50 μm particularly preferably. If the average pore diameter is less than the lower limit, the pressure loss may increase. If the average pore diameter exceeds the upper limit, the strength of the honeycomb structure may deteriorate. The average pore diameter is a value measured with a mercury porosimeter.

The partition wall 1 has porosity of 25 to 80% preferably, and 35 to 75% particularly preferably. If the porosity is less than the lower limit, the pressure loss may increase. If the porosity exceeds the upper limit, the strength of the honeycomb structure 100 may deteriorate. The porosity is a value measured with a mercury porosimeter.

The partition wall 1 has a thickness of 40 to 600 μm preferably, and 150 to 400 μm particularly preferably. If the thickness of the partition wall 1 is less than the lower limit, the strength of the honeycomb structure 100 may deteriorate. If the thickness exceeds the upper limit, the pressure loss may increase.

The shape of the honeycomb structure body 10 is not limited especially. Preferable examples of the shape of the honeycomb structure body 10 include a round pillar-shape, a pillar-shape having an elliptical end face, and a pillar-shape having a polygonal end face, such as "square, rectangle, triangle, pentagon, hexagon, and octagon". The honeycomb structure 100, 101 shown in FIGS. 1 to 4 has a round pillar-shaped honeycomb structure body 10.

The shape of cells of the honeycomb structure body 10 (the shape of cells in a cross section orthogonal to the extending direction of the cells) is not limited especially. Examples of the shape of cells include a triangle, a quadrangle, a hexagon, an octagon, a circle and the combination of them. Among the quadrangles, a square or a rectangle is preferable.

The cell density of the honeycomb structure body 10 is not limited especially. The honeycomb structure body 10 preferably has a cell density of 15 to 200 cells/cm$^2$, and 30 to 100 cells/cm$^2$ particularly preferably. If the cell density is less than the lower limit, the pressure loss may increase for a short time when exhaust gas passes through the honeycomb structure or the strength of the honeycomb structure 100 may deteriorate. If the cell density exceeds the upper limit, the pressure loss may increase.

As shown in FIGS. 1 and 2, the honeycomb structure body 10 may include a circumferential wall 21 at the circumference (other than a part of the convex part). This circumferential wall 21 may be made of the same material as that of the circumference coating layer 20. Such a circumferential wall 21 can suppress a defect such as chipping of the honeycomb structure body 10 even when external force is applied to the honeycomb structure body 10 during conveyance of the honeycomb structure 100.

Figure 5:
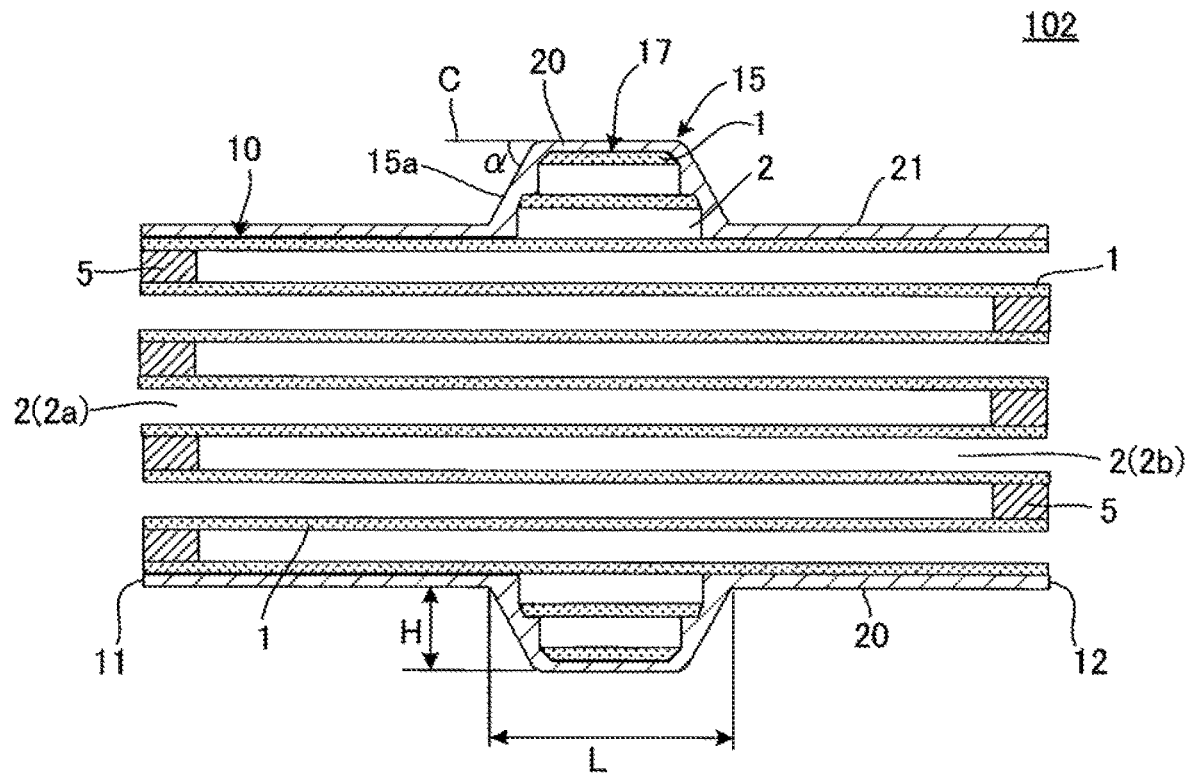
FIG. 5 is a schematic view of a cross section that is parallel to the extending direction of cells in another embodiment of the honeycomb structure of the present invention.

In the honeycomb structure of the present invention, the honeycomb structure body may include a plugging portion disposed at open ends of at least a part of the cells. Such a plugging portion allows exhaust gas flowing into the honeycomb structure of the present invention to be filtered with the partition wall, and so particulate matter in the exhaust gas can be trapped favorably. The honeycomb structure 102 shown in FIG. 5 includes a plugging portion 5 disposed at open ends of predetermined cells 2 (inflow cells 2a) at one end face and at open ends of the residual cells 2 (outflow cells 2b) at the other end face. The inflow cells 2a and the outflow cells 2b are disposed alternately. Thereby, a checkerboard pattern is formed with the plugging portion 5 and the "open ends of the cells" at each of the inflow end face 11 and the outflow end face 12 of the honeycomb structure 102.

The plugging portion 5 and the honeycomb structure body may be made of the same material or of different materials. The plugging portion 5 preferably is made of a material that is a preferable material of the honeycomb structure body (partition wall).

The plugging portion 5 has a length in the extending direction of the cells that is 1 to 15 mm preferably, and 5 to 10 mm more preferably.

The honeycomb structure body may include a plurality of pillar-shaped honeycomb segments and a bonding layer disposed to bond these plurality of honeycomb segments at their lateral faces.

(2) Method for Manufacturing Honeycomb Structure:

The honeycomb structure of the present invention can be manufactured by the following method. Specifically the honeycomb structure of the present invention can be manufactured by a method including: a honeycomb fired body manufacturing step of manufacturing a honeycomb fired body; and a cutting step of cutting the circumferential part of this honeycomb fired body to form a convex part. When the honeycomb structure includes a circumference coating layer, the method preferably includes a circumference coating layer formation step following the cutting of the circumferential part of the honeycomb fired body. The "honeycomb fired body" includes a porous partition wall that defines a plurality of cells serving as a through channel of fluid, the porous partition wall being formed by firing a ceramic raw material.

The following describes each step of the method for manufacturing the honeycomb structure of the present invention.

(2-1) Honeycomb Fired Body Manufacturing Step:

The honeycomb fired body manufacturing step is to manufacture a honeycomb fired body including a porous partition wall that is formed by firing a ceramic raw material. The method for manufacturing the honeycomb fired body is not limited especially. The following describes the stages of the honeycomb fired body manufacturing step.

(2-1-1) Forming Step:

Firstly, in the forming step, a ceramic forming raw material containing a ceramic raw material is preferably formed to be a honeycomb formed body so that the honeycomb formed body includes a partition wall (not fired) that defines a plurality of cells serving as a through channel of fluid. The honeycomb formed body is a formed body having a honeycomb structure.

The ceramic raw material contained in the ceramic forming raw material preferably includes at least one type of materials selected from the group consisting of cordierite forming raw material, cordierite, silicon carbide, silicon-silicon carbide composite material, mullite, and aluminum titanate. The cordierite forming raw material is a ceramic raw material formulated to have a chemical composition in the range of 42 to 56 mass % of silica, 30 to 45 mass % of alumina and 12 to 16 mass % of magnesia. The cordierite forming raw material forms cordierite after firing.

The ceramic forming raw material is preferably prepared by mixing dispersing agent, organic binder, inorganic binder, pore former, surfactant, or the like with the ceramic raw material as stated above. The composition ratio of these raw materials is not limited especially, and a composition ratio suitable for the structure and its materials and the like of the honeycomb structure to be manufactured is preferable.

When the ceramic forming raw material is formed, it is preferable that the ceramic forming raw material firstly be kneaded to be a kneaded material, and the obtained kneaded material be formed to have a honeycomb shape. A method for preparing a kneaded material by kneading the ceramic forming raw material is not limited especially. For instance, a kneader or a vacuum pugmill may be used for this purpose. A method for forming a honeycomb formed body by forming a kneaded material is not limited especially, and a well-known method for forming can be used, such as extrusion or injection molding. A preferable example of the method for forming a honeycomb formed body by forming a kneaded material includes a method for forming a honeycomb formed body by extrusion using a die having a desired cell shape, partition wall thickness and cell density. A preferable material of the die is cemented carbide having wear resistance.

Examples of the shape of the honeycomb formed body include a round pillar-shape, a pillar-shape having an elliptical end face, and a polygonal prismatic columnar shape having an end face of a shape, such as "square, rectangle, triangle, pentagon, hexagon, and octagon". When a honeycomb structure having a "convex part including a flat part" is manufactured, a polygonal prismatic columnar shaped honeycomb formed body is preferable. This is because, by leaving a part of the lateral face of the polygonal prismatic column, a part of this remaining lateral face can be a flat part. That is, the operation to shape a flat part can be omitted. For the honeycomb formed body, a quadrangular prismatic columnar shape is preferable.

After forming as stated above, the obtained honeycomb formed body may be dried. A method for drying is not limited especially. Examples of the method for drying include hot air drying, microwave drying, dielectric drying, reduced-pressure drying, vacuum drying, and freeze-drying. Among them, dielectric drying, microwave drying or hot air drying is preferably performed alone or in combination.

(2-1-2) Firing Step:

Next the honeycomb formed body is fired to manufacture a honeycomb fired body. Before firing (main firing) the honeycomb formed body, it is preferable that the honeycomb formed body be calcinated. The calcination is for degreasing. A method for calcinating the honeycomb formed body is not limited especially, as long as it can remove organic substance (organic binder, surfactant, pore former and the like). In general the combustion temperature of organic binder is about 100 to 300° C., and the combustion temperature of pore former is 200 to 800° C. Therefore, the calcination is preferably performed under the conditions at 200 to 1000° C. for 3 to 100 hours in an oxidizing atmosphere.

Firing (main firing) of the honeycomb formed body is performed to sinter the forming raw material making up the calcinated honeycomb formed body for densification to obtain a predetermined strength. Since the conditions for firing (temperature, time, atmosphere and the like) vary with the types of the forming raw material, appropriate conditions may be selected in accordance with the type. For instance, when a cordierite forming raw material is used, the temperature for firing is preferably 1410 to 1440° C. The firing time is preferably 4 to 8 hours, which is a time to keep the highest temperature. An apparatus for calcination and main firing is not limited especially, and an apparatus such as an electric furnace or a gas furnace can be used.

(2-2) Cutting Step:

The cutting step is to cut the circumferential part of the honeycomb fired body. The method for cutting the honeycomb fired body is not limited especially. The circumferential part of the honeycomb fired body may be cut by a conventionally well-known method appropriately, and the honeycomb fired body is preferably cut by pressing a diamond-covered grinding stone against the honeycomb fired body while rotating the honeycomb fired body. The thickness of the "circumferential part of the honeycomb fired body that is cut in the cutting step is the same as the thickness of the convex part formed after the cutting.

When the convex part has a flat part, the honeycomb fired body is cut as follows preferably. Specifically the honeycomb fired body is preferably cut so that a part of the lateral face of the polygonal prismatic columnar honeycomb fired body is left, and a part of this remaining lateral face is a flat part of the convex part. This can eliminate the necessity of forming a flat part after the cutting.

The cutting may be performed before or after firing of the honeycomb formed body, and the cutting is preferably performed after firing. Cutting after firing enables the shape of the honeycomb fired body to be corrected even when the honeycomb fired body is deformed by firing.

(2-3) Plugging Step:

When a honeycomb structure having a plugging portion is manufactured, the following plugging step is performed preferably after the cutting step. In this plugging step, a plugging portion is disposed at open ends of "predetermined cells (inflow cells)" at one end face (inflow end face) and at open ends of the "residual (outflow cells)" at the other end face (outflow end face). The following describes the plugging step specifically.

Firstly open ends of the cells at one end face (inflow end face) of the honeycomb fired body (honeycomb structure body) are filled with a plugging material. A preferable method for filling the open ends of the cells at one end face (inflow end face) with the plugging material includes a masking step and a press-fit step. The masking step is to attach a sheet at one end face of the honeycomb fired body and bore holes at positions of the sheet overlapping with the "cells to which plugging portions are to be formed". The press-fit step is to press-fit the "end of the honeycomb fired body to which the sheet is attached" into a vessel storing a plugging material to press-fit the plugging material into the cells of the honeycomb fired body. When the plugging material is press-fitted into the cells of the honeycomb fired body, the plugging material passes through the holes formed at the sheet and are charged into the cells in communication with the holes formed at the sheet only.

The plugging material can be prepared by mixing the raw materials mentioned as the elements of the ceramic forming raw material as stated above appropriately. A ceramic raw material contained in the plugging material is preferably the same as the ceramic raw material that is used as the raw material of the partition wall.

Next, the plugging material charged in the honeycomb fired body is preferably dried.

At one end face (inflow end face) of the honeycomb fired body, cells with the plugging portion and cells without the plugging portion are preferably arranged alternately. In this case, at one end face with the plugging portion, a checkerboard pattern is formed with the plugging portion and the "open ends of the cells".

Next, a plugging portion is preferably disposed at open ends of "the residual cells (second cells)" at the other end face (outflow end face) in a similar manner to the one end face (inflow end face). The plugging material may be dried after filling with the plugging material at both end faces of the honeycomb fired body. The firing step may be performed after filling the honeycomb formed body with the plugging material.

(2-4) Circumference Coating Layer Forming Step:

A circumference coating material is preferably applied to the circumference of the cut honeycomb fired body to form a circumference coating layer. Such a circumference coating layer can prevent chipping of the honeycomb structure when external force is applied to the honeycomb structure.

The circumference coating material may be prepared, for example, by adding an additive such as organic binder, foamable resin or dispersing agent to inorganic raw materials including inorganic fiber, colloidal silica, clay, SiC particles and adding water thereto, followed by kneading. The circumference coating material may be applied by coating with a rubber spatula, for example, while rotating the "cut honeycomb fired body" on a wheel.

A method for forming a rough-face region having surface roughness of 5 to 70 µm on the tapered face may be as follows. That is, the thickness of the circumference coating layer is thinned. That is, the circumference of the honeycomb structure body and the surface of the convex part before forming the circumference coating layer and the circumferential wall are rough (the values of their surface roughness are large). Therefore, the circumference of the honeycomb structure is made smoother (the values of their surface roughness is decreased) by forming the circumference coating layer and the circumferential wall. At this time, the thickness of the circumference coating layer is made thinner at the convex part, whereby a part of the circumference of the honeycomb structure body and the convex part can be made smooth (the values of their surface roughness are decreased) and the surface of the remaining part of the convex part can be rough at a desired level. At this time, the circumference coating layer is formed so that the total rough-face region angle θ of the rough-face region is 108° or more.

A method for forming the rough-face region includes a method for spraying a circumference coating material to a predetermined part of the convex part (a part where the rough-face region is to be formed) with a spray or the like.

Another method for forming the rough-face region includes a method for grinding a predetermined surface at a part of the honeycomb fired body where the convex part is to be formed (the surface where the rough-face region is to be formed) with a sandpaper or the like.

EXAMPLES

The following describes the present invention more specifically by way of examples. The present invention is not limited to the following examples.

Example 1

As the ceramic raw material, silicon carbide (SiC) powder and metal silicon (Si) powder were mixed. Hydroxypropylmethyl cellulose as binder and pore former were added to this, to which water was added, thus manufacturing a forming raw material. Then, the forming raw material was kneaded by a vacuum pugmill, thus preparing a kneaded material. Let that the total of silicon carbide (SiC) powder and metal silicon (Si) powder was 100 parts by mass, the content of the binder was 7 parts by mass. Let that the total of silicon carbide (SiC) powder and metal silicon (Si) powder was 100 parts by mass, the content of the pore former was 3 parts by mass. Let that the total of silicon carbide (SiC) powder and metal silicon (Si) powder was 100 parts by mass, the content of water was 42 parts by mass. The average particle diameter of silicon carbide powder was 20 µm and the average particle diameter of metal silicon powder was 6 µm. The average particle diameter of the pore former was 20 µm. The average particle diameter of silicon carbide, metal silicon and the pore former was a value measured by a laser diffraction/diffusion method.

The obtained kneaded material was formed by an extruder to have a honeycomb formed body having a quadrangular-prismatic columnar shape. The obtained honeycomb formed body was heated and dried by high-frequency induction heating, followed by drying at 120° C. for 2 hours by a hot-air drier.

Thereafter degreasing was performed at 550° C. for 3 hours and firing was performed for 2 hours under the argon atmosphere to have a plurality of honeycomb fired bodies having a quadrangular prismatic columnar shape.

The obtained honeycomb fired body was a quadrangular prismatic column having a cross section orthogonal to the extending direction of the cells of 160.0 mm in one side, and a length in the extending direction of the cells of 127.0 mm. The honeycomb fired body had the cell density of 47.2 cells/cm$^2$ and the thickness of the partition wall of 254 µm.

Next, a bonding material was applied to each of the lateral faces of the obtained plurality of honeycomb fired bodies, and these honeycomb fired bodies were assembled. After that, the bonding material was dried to have a quadrangular prismatic columnar shaped bonded member.

Next, the circumferential part of the obtained quadrangular prismatic columnar bonded member was cut so that a convex part was left at a center of the honeycomb structure body in the extending direction of the cells. Thereby the honeycomb structure body and the convex part protruding from a part of the circumference of this honeycomb structure body were formed at the honeycomb fired body to have a cut honeycomb fired body.

The circumferential part of the honeycomb fired body was cut by pressing a "diamond-covered grinding stone" against the circumferential part of the honeycomb fired body while rotating the honeycomb fired body as well as this grinding stone. The convex part had both ends that were a part to be a body of the convex part, and the both ends were of a tapered shape having a tapered face. In a cross section parallel to the extending direction of the cells, the tapered face of the body of the convex part and the extending direction of the cells formed an inclination angle, and the inclination angle was 35 degrees.

After that, a circumference coating material was applied to the circumference of the honeycomb fired body (the lateral faces of the honeycomb structure body and the surface of the convex part) to form the circumference coating layer and the circumferential wall, to have a honeycomb structure. At this time, the amount of the circumference coating material applied was decreased at a part where the rough-face region was to be formed (that is, the circumference coating layer was made thinner there).

The honeycomb structure body of the obtained honeycomb structure was circular in the shape of a cross section orthogonal to the extending direction of the cells, and the diameter in the cross section orthogonal to the extending direction of the cells was 143.8 mm. The honeycomb structure body had the length in the cell extending direction of 127.0 mm.

The convex part was disposed so as to surround the circumference of the honeycomb structure body continuously like a ring as in the honeycomb structure 100 shown in FIGS. 1 and 2. The convex part had the length L (width of the convex part) in the cell extending direction of 20 mm. The width of the convex part was 16% of the overall length of the honeycomb structure body. The convex part had the maximum thickness H (thickness of the convex part) in a cross section orthogonal to the cell extending direction of 6.3 mm.

The convex part did not have a flat part.

The shortest distance X between one end face of the honeycomb structure body and the end face of the convex part facing in the same direction as the one end face of the honeycomb structure body (the position of the convex part relative to the one end face of the honeycomb structure body) was 56 mm.

The circumference coating layer had the average of surface roughness at the rough-face region of 20.5 µm and the thickness of 1 mm. The surface roughness (Ra) was a value measured in accordance with arithmetic average roughness JIS B 0601:2001. The "average of surface roughness at the rough-face region" was obtained by measuring surface roughness at any 5 positions selected, and calculating the average of their measurements. The total rough-face region angle θ of the rough-face region was 180°. The inclination angle α that was an angle formed between the tapered face of the convex part and the extending direction of the cells was 35.2 degrees.

The obtained honeycomb structure was evaluated on "the amount of displacement in the circumferential direction", "mat breakage" and "partial contact" by the following methods. Table 1 shows the result.

[Amount of Displacement in the Circumferential Direction]

The amount of displacement in the circumferential direction was evaluated by the hot vibration test. Specifically, a non-thermally expandable mat (ceramic mat) made of ceramic of 110 mm in length was wrapped around the honeycomb structure. This ceramic mat was wrapped around the convex part as the center. Then, the honeycomb structure around which the ceramic mat was wrapped was stored in a casing made of stainless steel (SUS430) divided into two parts. Then, the two parts were welded so as to assemble the casing for test in which the honeycomb structure was stored.

Next, the casing storing the honeycomb structure (casing for test) was mounted on a device for hot vibration test. Next, combustion gas of propane was continuously supplied into the casing by the device for hot vibration test so that the temperature of gas at the inlet end face of the honeycomb structure was 950° C. and the gas flow rate was 12 Nm$^3$/min.

Next, while continuously supplying the combustion gas into the casing, vibrations in the direction orthogonal to the extending direction of the cells of the honeycomb structure were applied to the casing (i.e., to the honeycomb structure stored in the casing). Specifically, vibrations at 200 Hz and 40 G were applied to the casing for 10 hours. After the test, the presence or not of displacement in the circumferential direction of the honeycomb structure (displacement in positional relationship in the circumferential direction between the casing and the honeycomb structure before and after the test) was checked, and it was evaluated by the following criteria.

When the amount of displacement (moving amount) in the circumferential direction of the honeycomb structure was 1.0 mm or less at the outermost circumference at any one of the end faces of the honeycomb structure, it was evaluated as "A". When the amount was in excess of 1.0 mm and 3.0 mm or less, it was evaluated as "B". When the amount of displacement exceeded 3.0 mm, it was evaluated as "C". Note here that the amount of displacement (moving amount) in the circumferential direction of the honeycomb structure is 3.0 mm or less, the honeycomb structure does not have a practical problem, and 1.0 mm or less is preferable.

[Mat Breakage]

Mat breakage was evaluated as follows. Firstly the manufactured honeycomb structure was stored in a casing. Next, vibrations were applied to the honeycomb structure stored in the casing in the shaking test. Then the mat breakage was evaluated by the following criteria. After removing the honeycomb structure from the casing, if the mat broke, it was determined as "broken". After removing the honeycomb structure from the casing, if the mat did not break, it was determined as "not-broken". Similarly to the evaluation of the "amount of displacement in the circumferential direction", vibrations at 200 Hz and 40 G were applied for 10 hours in the shaking test.

[Partial Contact]

Partial contact of the casing and the honeycomb structure was evaluated as follows. Firstly the manufactured honeycomb structure was stored in a casing. Next, marks were drawn at the honeycomb structure and at the casing to show the initial position of the honeycomb structure stored in the casing. After that, shaking test was conducted to the honeycomb structure. Then the partial contact was evaluated by the following criteria. If any breakage was found at the convex part of the honeycomb structure after the shaking test, it was determined as "contacted". If no breakage was found at the convex part of the honeycomb structure after the shaking test, it was determined as "not-contacted". Similarly to the evaluation of the "amount of displacement in the circumferential direction", vibrations at 200 Hz and 40 G were applied for 10 hours in the shaking test.

"Partial contact" refers to the state where the mat and the honeycomb structure come in contact locally due to the displacement of the honeycomb structure from the initial stored state in the casing, and a large load is applied to a part of the mat sandwiched between the honeycomb structure and the casing. As a result of the partial contact, a breakage may occur at the convex part of the honeycomb structure.

[Determinations]

The honeycomb structure was determined by the following criteria based on the above evaluations. When a honeycomb structure was evaluated as "A" or "B" on the "amount of displacement in the circumferential direction" and was evaluated as "not broken" on the "mat breakage", the honeycomb structure was determined as "OK". When the honeycomb structure had a flat part, if it was evaluated as "non-contacted" for "partial contact", the honeycomb structure was determined as "OK". When a honeycomb structure was evaluated as "C" on the "amount of displacement in the circumferential direction" and was evaluated as "broken" on the "mat breakage", the honeycomb structure was determined as "NG". When the honeycomb structure had a flat part, if it was evaluated as "contacted" for "partial contact", the honeycomb structure was determined as "NG".

TABLE 1

| | Surface roughness (Ra) (μm) | | | | | | Amount of displacement in circumferential direction | | | | |
|---|---|---|---|---|---|---|---|---|---|---|---|
| | Rough-face region | Region other than rough-face region | Angle of tapered face (deg.) | Thickness of convex part (mm) | Rough-face region angle θ (°) | Presence or not of flat part | (mm) | evaluations | Mat breakage | Partial contact | Judgement |
| Ex. 1 | 20.5 | 3.1 | 35.2 | 6.3 | 180 | no | 0.6 | A | not broken | — | OK |
| Ex. 2 | 21.3 | 3.4 | 38.4 | 6.8 | 108 | no | 2.2 | B | not broken | — | OK |
| Ex. 3 | 20.6 | 3.1 | 35.4 | 6.1 | 143 | no | 1.3 | B | not broken | — | OK |
| Ex. 4 | 20.7 | 3.1 | 36.4 | 6.0 | 144 | no | 1.0 | A | not broken | — | OK |
| Ex. 5 | 5.2 | 2.8 | 35.9 | 6.8 | 109 | no | 2.0 | B | not broken | — | OK |
| Ex. 6 | 5.1 | 3.3 | 37.1 | 6.5 | 180 | no | 0.9 | A | not broken | — | OK |
| Ex. 7 | 5.1 | 2.9 | 35.7 | 19.8 | 110 | no | 1.1 | B | not broken | — | OK |
| Ex. 8 | 67.9 | 2.9 | 35.7 | 6.2 | 108 | no | 1.1 | B | not broken | — | OK |
| Ex. 9 | 69.9 | 3.0 | 36.4 | 6.1 | 320 | no | 0.2 | A | not broken | — | OK |
| Ex. 10 | 21.9 | 3.7 | 10.1 | 6.7 | 109 | no | 1.2 | B | not broken | — | OK |
| Ex. 11 | 21.2 | 3.1 | 79.5 | 6.4 | 110 | no | 2.2 | B | not broken | — | OK |
| Ex. 12 | 21.1 | 3.5 | 36.4 | 1.2 | 108 | no | 2.3 | B | not broken | — | OK |
| Ex. 13 | 22.1 | 3.5 | 36.1 | 19.2 | 109 | no | 1.5 | B | not broken | — | OK |
| Ex. 14 | 5.1 | 3.7 | 79.9 | 1.0 | 108 | no | 2.9 | B | not broken | — | OK |
| Ex. 15 | 20.4 | 3.5 | 35.8 | 6.4 | 180 | yes | 0.5 | A | not broken | non-contacted | OK |
| Ex. 16 | 20.8 | 3.8 | 35.7 | 6.0 | 108 | yes | 0.8 | A | not broken | non-contacted | OK |
| Comp. Ex. 1 | n/a | 3.4 | 35.1 | 6.4 | n/a | no | 5.3 | C | broken | — | NG |
| Comp. Ex. 2 | 20.4 | 3.4 | 36.4 | 6.0 | 106 | no | 3.8 | C | broken | — | NG |
| Comp. Ex. 2 | 69.9 | 3.4 | 10.5 | 19.9 | 107 | no | 3.1 | C | broken | — | NG |
| Comp. Ex. 3 | 4.9 | 4.5 | 10.5 | 19.7 | 180 | no | 3.4 | C | broken | — | NG |
| Comp. Ex. 4 | 70.2 | 3.5 | 35.2 | 6.2 | 110 | no | 1.5 | B | broken | — | NG |
| Comp. Ex. 5 | n/a | 3.2 | 35.3 | 6.3 | n/a | yes | 3.0 | B | not broken | contacted | NG |

In Table 1, the "rough-face region" in the field of "surface roughness (Ra)" shows the average of surface roughness at the rough-face region. The "region other than rough-face region" in the field of "surface roughness (Ra)" shows the average of surface roughness at the region other than the rough-face region (smooth-face region). The field of "angle (degrees) of tapered face" shows the angle formed between the tapered face and the extending direction of the cells in a cross section parallel to the extending direction of the cells. The field of "thickness of convex part" shows the maximum thickness of the convex part in a cross section orthogonal to the cell extending direction. The field of "rough-face region angle $\theta$" shows the largest angle formed between two straight lines drawn from the center axis of the honeycomb structure toward the outer periphery so as to pass through the rough-face region, when the honeycomb structure was viewed parallel to the center axis of the honeycomb structure. When the honeycomb structure had a plurality of rough-face regions, this shows the total of the largest angles between the two straight lines for these rough-face regions.

Examples 2 to 16, Comparative Examples 1 to 5

Honeycomb structures were obtained similarly to Example 1 other than the conditions were changed as in Table 1. The obtained honeycomb structures were evaluated on "the amount of displacement in the circumferential direction", "mat breakage" and "partial contact". Then, the honeycomb structures were "determined" based on the above evaluations. Table 1 shows the result.

Examples 5 and 6 had four rough-face regions at the tapered face of the convex part, and the rough-face region angle $\theta$ shows the total angle of these regions. Other Examples and Comparative Examples had one rough-face region. Examples 15 and 16 had four flat parts at the convex part. Let that any line (reference line) passing through the center axis of the honeycomb structure and being orthogonal to the center axis was 0° to 180°, the positional relationship of the flat parts was four directions of 0°, 90°, 180°, and 270°. That is, a pair of flat faces parallel to the reference line and a pair of flat faces orthogonal to the reference line were formed as the flat parts (see FIG. 4). The thickness h of the convex part at these flat parts (i.e., a minimum thickness in a cross section orthogonal to the cell extending direction) was 1.1 mm.

Table 1 shows that the honeycomb structures of Examples 1 to 16 suppressed displacement in the circumferential direction when they were stored in a casing as compared with the honeycomb structures of Comparative Examples 1 to 5.

The honeycomb filter of the present invention can be preferably used as a filter to purify exhaust gas of a vehicle or the like.

DESCRIPTION OF REFERENCE NUMERALS

1: partition wall, 2: cell, 2a: inflow cells, 2b: outflow cell, 5; plugging portion, 10: honeycomb structure body, 11: inflow end face, 12: outflow end face, 15: convex part, 15a: tapered face, 16: flat part, 17: body of convex part, 18: rough-face region, 20: circumference coating layer, 21: circumferential wall, 100, 101, 102, 103: honeycomb structure, a: inclination angle, O: center axis, A, B: straight line, $\theta$: rough-face region angle

What is claimed is:

1. A honeycomb structure, comprising: a honeycomb structure body having an inflow end face as one end face and an outflow end face as the other end face and having a porous partition wall that defines a plurality of cells, the plurality of cells extending in an extending direction from the inflow end face to the outflow end face and serving as a through channel of fluid; and
a convex part that protrudes outward from a part of a circumference of the honeycomb structure body, wherein
the convex part is disposed to surround the circumference of the honeycomb structure body like a ring continuously or intermittently,
the convex part has a tapered face at least at one end thereof,
the convex part has a circumference coating layer formed at least on the tapered face,
the convex part has a maximum thickness of 1 to 20 mm in a cross section orthogonal to the extending direction of the cells,
the convex part has a rough-face region on less than the entirety of the tapered face including the circumference coating layer, the rough-face region having a surface roughness of 5 to 70 µm,
the honeycomb structure has a total of a rough-face region angle $\theta$ of 108° or more and 180° or less, the rough-face region angle $\theta$ being a largest angle formed between two straight lines drawn from a center axis of the honeycomb structure toward an outer periphery so as to pass through the rough-face region, when the honeycomb structure is viewed parallel to the center axis of the honeycomb structure, and
an inclination angle formed between the tapered face and the extending direction of the cells in a cross section parallel to the extending direction of the cells is 10 to 80 degrees.

2. The honeycomb structure according to claim 1, wherein the convex part has width in a cross section parallel to the extending direction of the cells, the width being 1 to 80% of an overall length of the honeycomb structure body.

3. The honeycomb structure according to claim 1, wherein a part of the surface of the convex part defines a flat part that is a flat face parallel to the extending direction of the cells.

4. The honeycomb structure according to claim 1, wherein the honeycomb structure body includes at least one type selected from the group consisting of cordierite, silicon carbide, mullite, aluminum titanate, and alumina.

5. The honeycomb structure according to claim 1, wherein the honeycomb structure body has a plugging portion that plugs open ends of inflow cells as predetermined cells of the plurality of cells at the inflow end face and open ends of outflow cells as residual cells of the plurality of cells at the outflow end face.

* * * * *